April 28, 1931.  J. T. T. KISINGER  1,802,385
HARROW TOOTH
Filed May 20, 1929
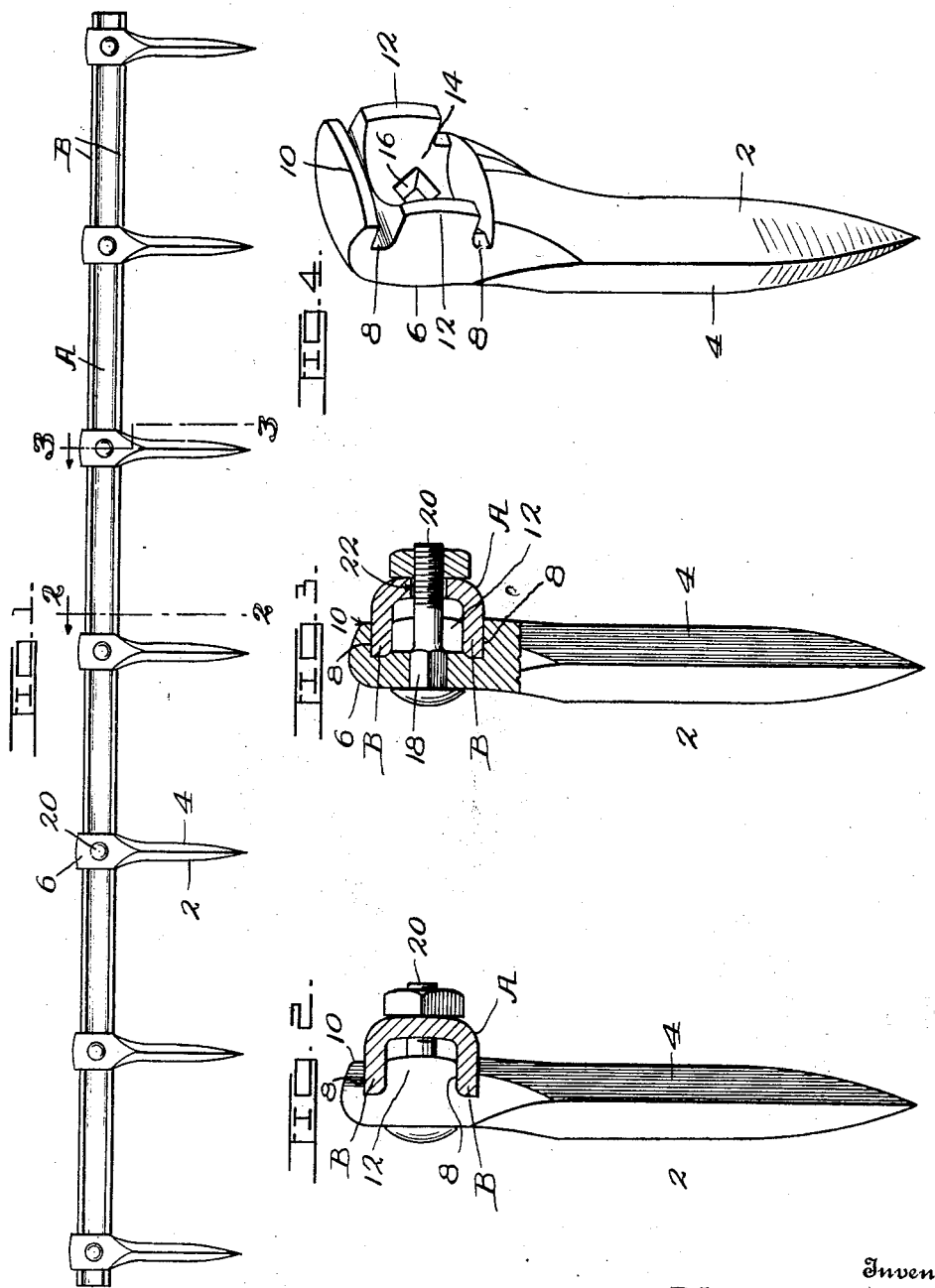
Inventor:
John T. T. Kisinger,
Witness:
Fred C. Fischer
By F. G. Fischer,
Attorney.

Patented Apr. 28, 1931

1,802,385

UNITED STATES PATENT OFFICE

JOHN T. T. KISINGER, OF STILWELL, KANSAS

HARROW TOOTH

Application filed May 20, 1929. Serial No. 364,559.

My invention relates to new and useful teeth such as are employed on harrows for the cultivation of the soil, and one object is to provide teeth of this character which can be secured to the beams of the harrow without the use of clamps, plates, or other extraneous fastening means other than simple bolts.

A further object is to provide harrow teeth having their upper portions shaped to so engage the beams that special fittings will not be required to secure said teeth to the beams.

In order that the invention may be fully understood, reference will now be had to the accompanying drawing, in which:

Fig. 1 is a side elevation of a harrow beam equipped with a number of the teeth.

Fig. 2 is a vertical section on line 2—2 of Fig. 1.

Fig. 3 is an irregular vertical section on line 3—3 of Fig. 1.

Fig. 4 is a detail perspective view of one of the harrow teeth constituting the present invention.

Referring in detail to the different parts, A designates the harrow beam which is of channel bar construction and has a pair of upper and lower longitudinal marginal flanges B.

2 designates a one-piece harrow tooth which consists of a shank 4 and an enlarged head 6. The shank 4 is preferably diamond shaped in cross section, although it may be of any other desired configuration.

The head 6 is wider than the shank 4 and provided at one side with a pair of parallel horizontally disposed grooves 8 for the reception of the flanges B. The upper end of the head 6 is provided with a lip 10 and the intermediate portion of said head is provided with vertical shoulders 12. The lip 10 is arranged above the uppermost groove 8 and is adapted to overlap the top of the beam A while the shoulders 12 are arranged between the grooves 8 and adapted to project inwardly between the flanges B of the beam as shown by Figs. 2 and 3. If preferred the shoulders 12 may be united to form a single shoulder, but I prefer to hollow out the head between said shoulders 12 as indicated by the reference numeral 14.

The head 6 is pierced by a horizontally-disposed hole 16 which is arranged centrally between the grooves 8 and the shoulders 12 and is preferably of rectangular configuration for the reception of the rectangular portion 18 of a bolt 20 employed in holding the tooth in position upon the beam A, which latter has a hole 22 in line with the hole 16 for the reception of said bolt 20.

By providing the head 6 with the grooves 8, the lip 10 and the shoulders 12, it is apparent that when the head 6 of the tooth 2 is firmly drawn into position on the frame A by means of the bolt 20 that said bolt will be relieved of substantially all lateral stresses by said lip and shoulders, and hence is not likely to become bent from the rough usage to which implements of this class are subjected.

From the foregoing description it is apparent that I have provided a harrow tooth embodying the advantages above pointed out, and while I have shown and described one form of the invention I reserve all rights to such other forms and modifications as properly fall within the spirit and scope of the invention as claimed.

Having thus described my invention, what I claim and desire to secure by Letters Patent, is:

In combination with a beam having upper and lower parallel flanges, a one-piece harrow tooth provided at its upper portion with horizontally disposed upper and lower grooves for the reception of said flanges, a lip extending over the upper groove and which overlaps the upper flange, a pair of shoulders extending vertically from the lower to the upper groove and projecting between said flanges, and a bolt extending through horizontally alined holes in the beam and the tooth for drawing the latter firmly against said beam.

In testimony whereof I affix my signature.

JOHN T. T. KISINGER.